May 20, 1969 R. D. ATCHLEY 3,444,877
HYDRAULIC FLUID AMPLIFIER CONTROLLED SERVOVALVE
Filed March 16, 1966
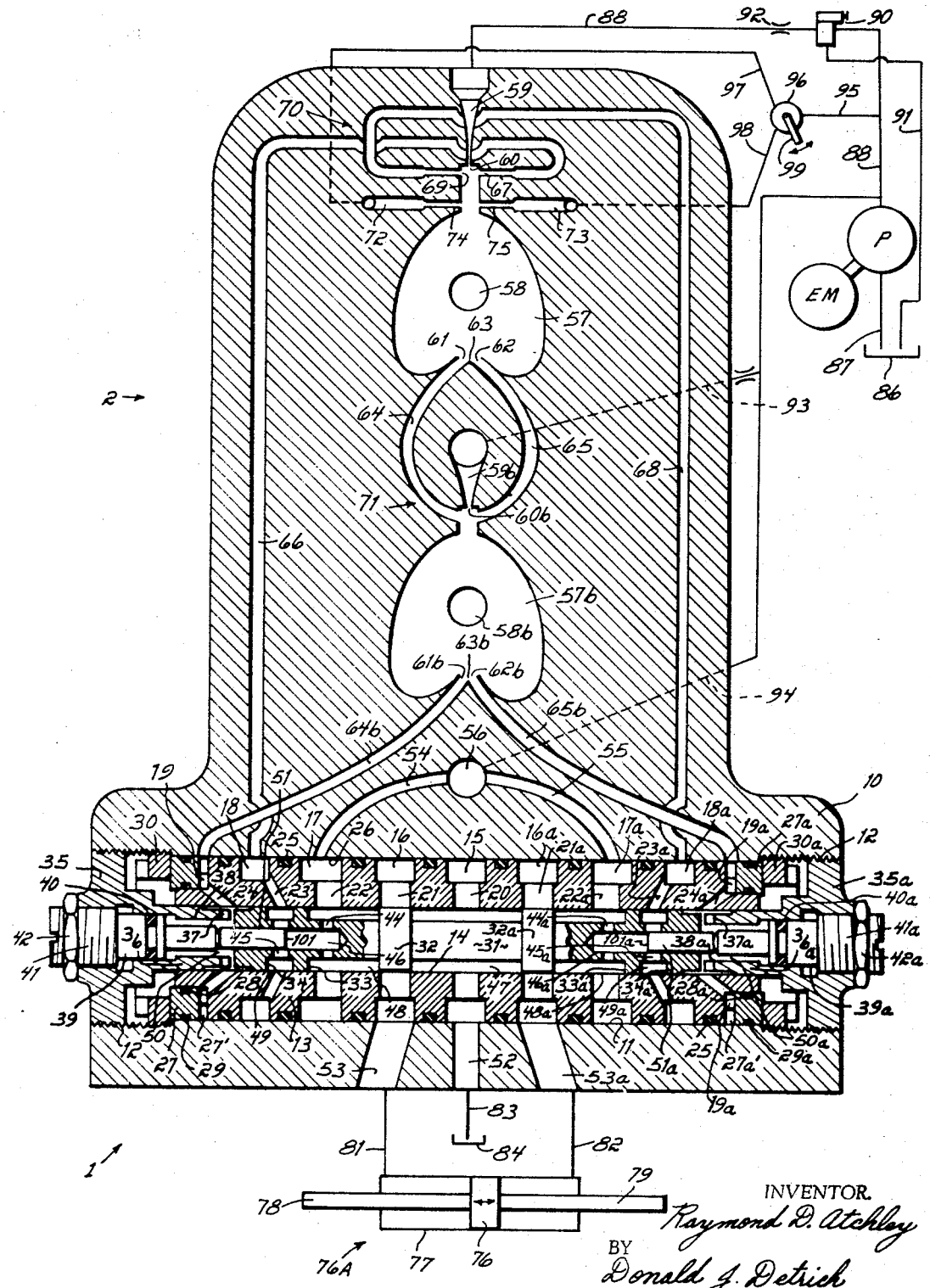
INVENTOR.
Raymond D. Atchley
BY
Donald J. Detrick
AGENT

United States Patent Office 3,444,877
Patented May 20, 1969

3,444,877
HYDRAULIC FLUID AMPLIFIER CONTROLLED SERVOVALVE
Raymond D. Atchley, Los Angeles, Calif., assignor to Abex Corporation, a corporation of Delaware
Filed Mar. 16, 1966, Ser. No. 534,745
Int. Cl. F15c 3/02
U.S. Cl. 137—81.5                8 Claims

ABSTRACT OF THE DISCLOSURE

A feedback value is associated with each of two feedback passages communicating between the bore of a spool-type work valve and the interaction chamber of a hydraulic amplifier. Each of the two feedback streams intersect the amplifier's one control stream so as to deflect the control stream in a direction opposite to the deflection imparted by its related regulator stream, the difference of regulator stream momenta impinging on the control stream being determined by the setting of a control valve so as to position the spool as desired within the bore. When the setting of the control valve is changed to reposition the spool within the bore, movement of the spool causes each feedback valve to open or close as required to stop and maintain the spool at the new position indicated by the new control valve setting by effecting an equilibrium between the feedback streams and regulator streams acting on the control stream at that new control valve setting.

Each feedback valve includes an axial passage toward one end of the spool to which work fluid is constantly provided. The axial passage has an outlet port in the spool that communicates with the feedback passage, and receives a piston slidable in that passage relative to movement of the spool. Thus, each feedback valve is operated by movement of the spool within the bore, such movement being initiated when the control stream signal received from the hydraulic amplifier changes in response to a new control valve setting.

---

This invention relates to servovalves for controlling a flow of hydraulic fluid in accordance with a hydraulic command signal which is of relatively low energy as compared with the energy of the controlled fluid.

Servovalves are widely used to control pressure fluid flow in response to a command signal, for example, to apply the fluid to a fluid motor to cause the motor to start, stop, or operate at a selected rate. In effect, a small force is used to control a large force. In previously servovalves the command signal has often been an electrical signal which is applied to an electromagnetic transducer operative to develop a pressure differential between two hydraulic passages. The pressure differential is applied to a shiftable spool valve member to cause it to move to a position related to the magnitude of the applied control signal, movement of the spool valve changing the flow of fluid between various ports which communicate through the bore in which the spool slides. One valve of this type is shown in my previous Patent No. 2,884,-907. Such servovalves have provided large amplification factors; that is, an electric control signal of low energy can be used to control the flow of hydraulic fluid of much higher energy. In effect, the signal modulations of the control are "amplified" and are reflected in the delivery of hydraulic fluid through the valve.

However, electromagnetic transducer controlled servovalevs require a high degree of precision in manufacture. Not only must extremely close tolerances be maintained if the valve is to operate properly, assembly of the parts is relatively difficult because of the small size of parts and the complete freedom from contamination which must be maintained. Moreover, the initial adjustment of such valves is a time consuming procedure, and it may be impared by improper or rough use in operation.

In contrast to the electromagnetic transducer controlled-type of servovalve, the valve to which this invention is directed is controlled by an entirely hydraulic fluid amplifier. The input sginal applied to the fluid amplifier is a differential flow rate between two fluid streams. Although the relative flow rates and pressures of these regulator streams may be quite small, the streams are utilized in this invention to control the delivery of flow of a much larger volume of fluid which may be at high pressure. Gain or amplification factors more or less comparable to those attained in electromechanical transducer controlled servovalves are possible, but they are not attended by the complexity, expense and delicacy of adjustment of the electromagnetic type of valve.

In the valve of this invention, the fluid amplifier section of the valve responds to a differential in the momenta of two opposed regulator streams which impinge angularly on a control stream. An unbalance of the regulator streams deflects the control stream toward one or the other of a pair of receiver ports. Such deflection of the control stream creates a differential pressure between receiver ports. This pressure differential may be used to obtain additional amplification in a second or other stages in the fluid amplifier, and from the last stage the amplified differential at the receiver ports is reflected on opposed control surfaces on the main spool valve element to cause the spool valve to move in the bore in which it slides.

Since the pressure differential applied to the main spool will cause it to move as long as the differential exists, provision is made to equalize the opposing pressures on its control surfaces when the spool reaches a desired position corresponding to a desired rate of flow of the controlled fluid. A fluid signal related to the position of the spool is continuously fed back to the control stream. This feedback signal causes the spool to stop moving at a position correlated to the input signal of the regulator streams.

In the valve of this invention such feedback is attained by the provision of opposed feedback passages which direct fluid streams to impinge upon the control stream. The feedback streams tend to deflect the control stream in the direction opposite to the deflection imparted to it by the regulator streams. Hydraulic "potentiometers" in the feedback passages reversely open and close at equal rates as the spool moves, thereby regulating the flow of fluid in the feedback passages which, in turn, changes the deflection imparted to the control stream in accordance with the movement of the spool. The potentiometers are arranged to permit equal flows in the feedback passages at the time the spool begins to move from a centered or close position and, as the spool continues to move, to regulate the feedback streams to increasingly deflect the control stream in the direction opposing the deflection imparted to the control stream by the regulator streams. Ultimately the feedback deflection offsets the deflection by the regulator streams, with the result that the control stream is again directed equally between the two control ports. The pressure differential between the ends of the spool is thereby removed and the spool remains in a predetermined axial position which is correlated with the magnitude of the applied signal.

The hydraulic amplifier section has no moving parts, and comprises merely a valve body having various ports and passages formed in it. As a result, the manufacturing costs are substantially reduced in comparison to other types of servovalves with comparable amplification. The overall amplification factor can be increased by adding or stacking additional ampliflying stages.

Because of the rapidity with which fluid pressure changes are reflected in the streams of pressure fluid, response of the valve is exceptionally quick. Moreover, the lag time inherent in valves which require movement of mechanical parts is eliminated.

The invention can best be further described by reference to the accompanying drawing which illustrates in vertical axial section a valve operated by a fluid amplifier and regulated by fluid pressure feedback means in accordance with a preferred embodiment of this invention.

The valve, which is shown in the drawing for purposes of illustration, comprises a main section designated generally by 1 which is controlled by a fluid amplifier section designated generally by 2. Both sections 1 and 2 may be housed within a common valve body 10. The valve body has a cross-bore 11 which is threaded at each end, as at 12.

A hollow, generally cylindrical sleeve 13 is axially received in and sealed to bore 11. This sleeve 13 has a chamber or bore 14 formed through it in the axial direction. Sleeve 13 also has a centrally located outer circumferential groove 15, on both sides of which the sleeve and entire main section 1 are symmetrical.

In the following description the elements of the main section 1 which are on the right hand side of the central groove 15 bear the same number designations as the corresponding elements on the left hand side, but are followed by the letter a.

On opposite sides of central groove 15 of sleeve 13 are grooves 16 and 16a, 17 and 17a, 18 and 18a, and end shoulders 19 and 19a. These elements are symmetrically formed at spaced axial positions. Radial ports or passages 20 are drilled between groove 15 and the axial bore 13. On opposite sides of the ports 20 other ports or passages 21 and 21a, 22 and 22a, 23 and 23a, and 24 and 24a provide balanced fluid communication between sleeve bore 13 and grooves and shoulders 16–19a, respectively, of the sleeve. O-rings, each denoted by 25, are mounted in circumferential grooves in the sleeve outer surface 26 adjacent each groove to seal the sleeve to body bore 11.

Sealing rings 27, 27a, carrying inside and outside O-rings 28, 28a, and 29, 29a respectively, are inserted at each end of sleeve 13 in the annular space between the sleeve outer shoulders 19, 19a and body bore 11. Each ring 27, 27a includes lugs or bosses 27', 27a' by which it is spaced from the end face of shoulder 19, 19a, thereby defining an annular channel or passage between each spool shoulder and the adjacent sealing ring. Sleeve positioning and locking means 30, 30a are secured in each end of valve body bore 11 and abut the sealing rings 27 and 27a, thereby clamping the lugs 27', 27a' thereof against sleeve 13 and axially locating the sleeve in the bore.

Within the bore 14 of sleeve 13 a spool or piston valve element 31 is axially slidable. The spool 31 is symmetrical about its midpoint, and has a series of axially spaced lands 32, 32a, 33, 33a, and 34 and 34a which are defined by intermediate grooved portions.

End plugs 35, 35a are secured to and close the opposite ends of body bore 11. Each plug 35 and 35a has a central portion 36, 36a, respectively, which projects into and closes the opposite ends of sleeve bore 14. The inner ends are radially slotted, as at 37, 37a, and the spool valve element is reciprocable between the stops so formed. Each plug, 35a has an opening or through bore 38, 38a, in the central portion 36, 36a thereof, within each of which is disposed an axially adjustable abutment member 39, 39a, respectively. A fluid seal is developed between each abutment member 39, 39a and the corresponding end stop 35, 35a by an O-ring 40, 40a. Each abutment 39, 39a is axially positioned in its bore 38 or 38a by a screw 41, 41a threaded into the end of each stop and by a lock nut, 42, 42a.

At its opposite ends spool 31 has terminated axial bores 46, 46a which extend beyond lands 33, 33a. The spool lands 32, 32a, 33, 33a and 34, 34a cooperate with sleeve bore 14 to form fluid chambers including a central chamber or work chamber 47, supply chambers 48, 48a, feedback chambers 49, 49a and control chambers 50, 50a. Radial drill holes or ports 44, 44a in the spool provide constant fluid communication between supply chambers 48, 48a and spool bores 46, 46a respectively, and radial ports 45, 45a provide communication between feedback chambers 49, 49a and the bores 46, 46a, respectively. Thus, when the spool is in closed or central position, fluid passages are defined which are open at all times and through which fluid can flow from each supply chamber 48, 48a to the respective feedback chamber 49, 49a.

Valve elements or pistons 51, 51a are slidable within the respective spool bores 46, 46a and, during operation of the device, each piston 51, 51a is constantly urged against the adjacent abutment 39, 39a.

Sleeve grooves 15, 16, and 16a, respectively, communicate at all times with ports 52, 53, and 53a formed in valve body 10. The spool 31 is in a neutral or closed position, in which no fluid can flow through ports 20 and 21 or 21a, when spool lands 32, 32a completely cover or close ports 21, 21a. The axial length of each land 32, 32a is preferably just equal to the diameter of the bores 21, 21a to form a line on line closure.

The annular groove 15 at all times communicates with body drain outlet 52 and, through sleeve bore 20, with the central valve chamber 47. The annular sleeve grooves 17, 17a constantly communicate with supply chambers 48, 48a of the spool through sleeve bores 22, 22a, and the annular sleeve grooves 18, 18a communicate with the spool feedback chambers 49, 49a through feedback bores 23, 23a, respectively. The annular control passages 19, 19a communicate with the spool control chambers 50, 50a through control bores 24, 24a, respectively.

Pressure fluid for operating a load to which the valve is hydraulically connected is delivered to the spool supply chambers 48, 48a through two work fluid conduits 54, 55 from a main work fluid inlet port or conduit 56 in valve body 10. Conduits 54 and 55 communicate with grooves 17, 17a, respectively, in sleeve 13.

The fluid amplifier section 2 establishes the fluid pressures within the control chambers 50, 50a of the main section by which spool 31 is moved and positioned axially. A two-stage fluid amplifier is shown in the figure, but from the following description it will be seen that, depending upon amplification requirements, the servo-valve can be operated by one or a plurality of amplifier stages.

The two stages of amplifier section 2 are designated as 70 and 71. Elements common to both stages have the same number, those of the second stage having the suffix b. Each stage includes an inverted apple- or heart-shaped interaction chamber 57, 57b having balance or drain ports 58, 58b in the side thereof. A control fluid conduit 59, 59b axially enters each interaction chamber 57, 57b at the upper end thereof. Each control fluid conduit 59, 59b is preferably restricted, as at 60 and 60b, to form a nozzle above the interaction chamber. At the junction of the lobes of each interaction chamber, i.e., opposite to the entrance of control fluid conduit 59, 59b thereto, are two receiver outlet ports 61, 62, and 61b, 62b which lead to receiver passages or conduits 64, 65, and 64b, 65b, respectively. The receiver ports 61, 62 and 61b, 62b are respectively separated by a knife edge or pointed splitter 63, 63b adjacent chambers 57, 57b and an acute angle is thus formed between the sides of the splitter.

A feedback passage 66 provides for fluid flow from sleeve groove 18 to a nozzle 67 which is preferably directed perpendicularly to the axis of control nozzle 59. A second feedback passage 68 provides a flow path between sleeve groove 18a and a nozzle 69 which is directly opposed to nozzle 67.

Also associated with the first stage 70 of the proportional amplifier 2 are regulator fluid conduits or passages 72, 73 which communicate from a source of pressure fluid signals, through restricted nozzle portions 74, 75, respectively, with control fluid conduit 59 downstream of nozzle 60. These nozzles 74 and 75 are parallel to feedback nozzles 69 and 67, respectively, and are spaced slightly from them. The intersections of the regulator fluid conduits 72, 73 with the control fluid conduit 59 are diametrically opposed, and the nozzle portions 74, 75 of these conduits are preferably perpendicular to the axis of conduit 59.

It will be noted that the feedback streams from nozzles 67 and 69 are transposed with respect to the regulator streams from nozzles 74 and 75; that is, for example, flow from the left feedback chamber 49 is directed into conduit 59 from the right side thereof. In effect, the wide or mouth portions of conduits 59, 59b downstream of the nozzles 60, 60b are part of their respective interaction chambers, in that feedback streams from passages 66 and 68 and regulator streams from passages 72 and 73 impinge on the control stream in these regions.

The receiver conduits 64, 65 of the first stage 70 of the proportional amplifier lead the control fluid from the first stage to the second stage 71 where it is directed to function in the same manner as the regulator fluid of the first stage. Thus fluid entering the receiver ports 61 and 62 of the first stage operates on control fluid entering the second interaction chamber 57b from the second stage control fluid conduit 59b. The receiver conduits 64b, 65b from the second stage 71 of the amplifier communicate with the control passages 24, 24a, respectively, of the main section 1 and the associated control chambers 50, 50a, to reflect therein a fluid pressure differential on the ends of the spool valve 31. The opposed pressures in chambers 50, 50a act on equal spool areas or control surfaces, thereby controlling the axial position of the spool with respect to sleeve ports 21, 21a and, hence, controlling the flow of work fluid through the main valve section.

To facilitate further explanation of the operation of the valve of this invention, the valve is shown in the drawing as connected in one type of illustrative hydraulic system to supply pressure fluid to position or reciprocate a double ended linear fluid motor 76a. The fluid motor 76a includes a pressure operated piston 76 which slides in a cylinder 77. The piston 76 has operating shafts or rods 78, 79 connected to its opposite sides and which project through the opposite ends of cylinder 77. The chambers in cylinder 77, on opposite sides of piston 76, are connected through lines 81 and 82 to body ports 53 and 53a respectively. The valve port 52 is connected by a line 83 to a fluid tank or reservoir 84.

Fluid pressure energy for operating the motor 76a is supplied by a pump P driven by an electric motor EM. The pump receives fluid from a reservoir or tank 86 through an intake line 87 and discharges pressure fluid into an outlet line 88. A relief valve 90 is connected to line 88 to prevent the pressure therein from exceeding a predetermined maximum, excess fluid being returned from relief valve 90 to tank 86 by a line 91.

From relief valve 90 line 88 is connected through a restrictor 92 to control conduit 59 in valve body 10. The pump discharge line 88 is also connected through lines 93 and 94 to supply pressure fluid to the second stage control passage 59b and to the main work fluid inlet port 56. Line 93 includes a restrictor. The drain ports 58, 58b of the respective interaction chambers 57, 57b of each of the stages 70 and 71 are connected to tanks 84 or 86 by suitable passages not shown in the figure.

The pump outlet line 88 is also connected through a branch line 95 to the inlet of a control valve 96. Valve 96 has a pair of outlet ports which are connected to lines 97 and 98, line 97 leading to regulator fluid conduit 72 and line 98 leading to regulator fluid conduit 73 of the first amplifier stage 70. The valve 96 may be of conventional type and is adapted to supply pressure fluid selectively to either outlet line 97 or 98 or both, and is controlled, for example, by a movable handle or control knob 99. The division of flow between the lines 97, 98 may conveniently be proportional to the handle position of the valve 96, thus, the relative momenta of the two regulator streams in lines 97 and 98 is adjustable.

The operation of the valve will now be explained. With pump P delivering pressure fluid to line 88, fluid flows from restrictor 92 at a reduced rate to the control passage 59 of the first amplifier stage 70. Nozzle 60 thereof directs a control stream toward splitter 63, the control stream being equally divided by the splitter between receiver ports 61 and 62 if not deflected. Assuming for the moment that there are no regulator streams from regulator passages 72 and 73, or that the momenta of the regulator streams are equal, thereby causing a negligible net effect on the direction of the control stream, the control stream is split uniformly into two streams by knife edge 63. Hence, equal fluid flows and pressures are transmitted to the second stage through receiver passages 64 and 65, in which they are utilized as regulator streams. Thus, it will be apparent that the first stage receiver passages 64, 65 communicate with the spool control surfaces via the second stage chamber 57b and the second stage receiver passages 64b, 65b.

The second amplifying stage control stream from nozzle 60b is ordinarily at a substantially greater flow rate than the first stage control stream, in order to achieve greater amplification. This stream will impinge equally on receiver ports 61b, 62b unless deflected toward one or the other by unbalanced regulator streams from passages 64 and 65. Under the conditions set forth above as being present in the first amplifier stage 70, equal fluid pressures are transmitted through the second amplifier stage 71 and act in control chambers 50, 50a on the opposite equal end areas or control surfaces of the spool. Thus, the spool is not caused to move within sleeve bore 14 under these conditions.

The spool will remain stationary so long as the momenta of the regulator streams remain equal. Thus, if the spool is in the closed or neutral position shown in the drawing, the pressure or work fluid applied through lines 54 and 55 to supply chambers 48, 48a, respectively, cannot flow to either of the work ports 53, 53a, those ports being closed by spool lands 32, 32a, respectively.

In normal operating conditions, each interaction chamber 57, 57b is completely filled with fluid, so that a volume of fluid equal to that entering each chamber flows out of the chamber through the respective drain port 58, 58b and through the respective receiver passages 64, 65 and 64b, 65b thereof. Moreover receiver passages 64b, 65b leading from the second stage interaction chamber 57b to control chambers 50 and 50a of the main section, are normally closed, i.e., when the spool 31 is not moving there is no significant fluid flow in either line 64b or 65b. Hence, a volume of fluid equal to that entering chamber 57b from conduit 59b plus the volume of the regulator streams entering the chamber from the receiver passages 64 and 65 of the first stage will be generally drained from the second stage chamber only through drain port 58b thereof.

When control valve 96 is operated to apply to one or the other of the regulator nozzles 74, 75 a greater fraction of the flow in line 95, then the momentum of one regulator stream intersecting the control stream in the first stage chamber 57 will overbalance the momentum of the opposing regulator stream. This unbalance will deflect the control stream from the path upon which it was directed by nozzle 60. For example, if the stream of greater momentum is from nozzle 75 the control stream will be deflected to the left so that it impinges with greater force upon receiver port 61 at the left side of splitter 63. Consequently, the momentum of the fluid stream in passage 64 flowing to the second stage regulator section is increased over that present in passage 65.

In the second stage, the fluid regulator stream issuing from line 64 impinges on the control stream from nozzle 60b with greater momentum than that of the stream from line 65 and, hence, the second stage control stream is deflected toward the right so that it impinges with greater force on second stage receiver port 62b than on receiver port 61b. This creates a differential between the fluid pressures in lines 64b and 65b, so that unequal pressures act upon the endwise control surfaces of spool 31. Thus, the control signal established by means 96 is amplified and is used to create a proportional pressure differential in the first stage 70. This differential is reamplified in the second stage 71 and is applied in main section 1 of the valve to the ends of the spool to position it axially in the sleeve bore 14.

In this example, the relatively greater pressure acting on the right end of spool 31 in chamber 50a displaces the spool to the left, thereby displacing to drain port 58b fluid from the left control chamber 50. As the spool moves to the left from the neutral position, a flow path is opened between supply chamber 48a and port 53a so that fluid flows into the section of the chamber 77 on the righthand side of the work piston 76 from the work fluid conduit 56. At the same time, a passage is opened between body port 53 and drain port 52, so that the section of the chamber 77 on the lefthand side of work piston 76 is connected to tank 84. Hence, the pressure on the right side of piston 76 displaces the piston to the left. Spool 31 will continue to move in sleeve bore 14 until it is physically impeded by the inner ends 37, 37a of the plugs 35, 35a or until the pressures in the endwise control chambers 50, 50a are equalized.

The pistons 51, 51a cooperate with the spool to form what may be called hydraulic potentiometers or valve means controlling the feedback streams to the first stage 70 of the fluid amplifier. These valve means control the feedback streams so that the latter deflect the control stream to equalize the ultimate pressures acting in chambers 50, 50a when the spool has moved to a position in bore 14 correlated to the magnitudes of the regulator stream signals.

The operation of the feedback mechanism is as follows: the pressure of fluid at inlet 56 is reflected at all times through sleeve grooves 17, 17a, ports 22, 22a, supply chambers 48, 48a and spool ports 44, 44a into the spool bores 46, 46a. Thus, substantially equal pressures act at all times on the inner end of pistons 51, 51a respectively, urging those pistons outwardly along the central axis of the spool and into contact with the abutting means 39, 39a. Ordinarily the pressure from port 56, as applied to these pistons 51, 51a, exceeds the opposing control pressures in chambers 50, 50a and hence the pistons are held constantly against the respective abutting members 39, 39a, regardless of the axial position of the spool in the sleeve.

The inner ends 101, 101a of pistons 51, 51a, respectively, form feedback regulating valves with outlet ports 45, 45a, respectively. Abutment members 39, 39a are positioned by adjusting means 41, 41a and 42, 42a, so that both feedback valves are in balanced positions when the spool is in the centered or neutral position shown. In these circumstances the feedback streams flow at equal rates through the valves formed between the ends of the pistons and outlet ports 45, 45a to feedback passages 66 and 68. The feedback lines 66 and 68 are in inverted orientation in the first stage of the amplifier with respect to the regulator passages 72, 73 so that the flow from feedback line 66 is directed on the control stream from the righthand side thereof while the flow from feedback line 68 is oppositely directed on the control stream, i.e., from the lefthand side thereof. When the spool is in the centered position these feedback flows are of equal momenta and, hence, have no net effect on the control stream and do not tend to deflect it to one side or the other of splitter 63.

As spool 31 is moved relatively to the left, for example, in response to a net positive pressure in control chamber 50a, the righthand feedback valve 45a, 101a is opened and the lefthand valve 45, 101 is closed at the same rate. Opening the righthand feedback valve allows fluid to flow at an increased rate through feedback line 68 while closing of the lefthand valve causes fluid to flow at a lesser rate through line 66. Hence, opposed feedback streams, from nozzles 67 and 69, of unequal momenta then impinge upon the control stream, and the control stream tends to be diverted toward the righthand side of splitter 63 by the net positive force from nozzle 69.

As the spool continues to be moved to the left, the deflection of the first stage control stream to the right by the feedback stream from nozzle 69 approaches an equilibrium with the leftwise deflection imparted to the control stream by the regulator stream from nozzle 75. Ultimately the two deflections equalize or reach an equilibrium state and the control stream is recentered on splitter 63 so that equal pressures act through lines 64a and 65b on the spool control surfaces. The spool then stops moving.

By symmetry considerations it can be seen that operation of the spool follows similar principles when the control valve 96 is operated to supply a major proportion of the input stream from line 95 to line 97, to cause the spool to move to the right.

The feedback mechanism, including the feedback valves, the passages by which fluid is supplied to the feedback valves, and the passages by which the flow through these valves is directed to react on the control stream, comprises means whereby the spool is stopped at an axial position in sleeve bore 14 which is related to the magnitude of the regulator signal or the magnitude of a differential regulator momentum impinging on the control stream.

Although pistons 51, 51a and their associated abutting members 39, 39a act as integral units, with respect to axial movement, the use of separate pistons and abutments avoids problems in aligning the axes of the abutment elements 39, 39a exactly with the axes of the spool bores 46, 46a, and thereby prevents sticking which might otherwise tend to impede free axial movement of the spool.

In actual practice, the first stage of the valve can be much smaller in size than that illustrated in the figure, in which the amplifier is shown greatly enlarged.

The amplification provided by the valve can be increased by adding additional amplifying stages. It is contemplated that separate amplifying stages can be manufactured as integral units adapted to be stacked on other amplifying stages by having passages therein for linking up with preceding and/or following stages. It is preferred that the amplifier body be formed in two axially symmetric halves which are adapted to meet along a planar face in which the passages are half-formed by casting and/or subsequent finishing operations as necessary.

The feedback passages, rather than being directed to only the first stage, can be directed to act upon the control stream of the second or subsequent amplifying stages in place of, or in addition to, interaction with the control stream applied to the first stage of the amplifier.

While the valve shown in the drawings is a preferred embodiment of the invention, those skilled in the art will appreciate that additional changes within the fluid amplifier section of the valve or within the main valve section, for example, in the arrangement or number of the ports served by the spool, can be made without departing from the scope of the following claims.

I claim:
1. An hydraulic fluid amplifier controlled valve comprising,
a body having a bore,
a series of ports entering said bore at axially spaced positions,
a spool slidable in said bore to control the flow of pressure fluid between said ports, said spool having opposite control surfaces a differential pressure on which tends to shift said spool in said bore,
means presenting a chamber,
a pair of adjacent receiver ports in said chamber that communicate with the respective control surfaces of said spool,
a control passage entering said chamber opposite said receiver ports, said control passage being aligned to direct a control stream across said chamber toward said receiver ports equally,
two regulator passages entering said chamber for di-directing opposing regulator streams to angularly intersect said control stream in said chamber,
control valve means for selectively unbalancing the flows of the respective regulator streams to impart a deflection to said control stream by bending said control stream toward one of said receiver ports and away from the other of said receiver ports,
two feedback passages communicating with said bore and said chamber for directing opposed feedback streams to intersect said control stream in said chamber, said feedback passages being so oriented that the feedback streams therefrom will deflect said control stream in a direction opposite to the deflection imparted by said regulator streams, and
feedback valve means associated with each of said feedback passages for stopping and maintaining said spool in said bore at a fixed axial position that is related to the difference of regulator stream momenta impinging on said control stream as determined by said control valve means.

2. A valve as set forth in claim 1 wherein said feedback valve means control the flow in said feedback passages in accordance with the position of said spool in said bore to increasingly offset the deflection imparted to said regulator streams as said spool is moved from a centered position in said bore by a differential pressure on said spool control surfaces upon a change in setting of said control valve means being effected.

3. A valve as set forth in claim 2 wherein each of said feedback valve means is operated to control the flow in said feedback passages by movement of said spool within said bore.

4. A valve as set forth in claim 3 wherein each of said feedback valve means is comprised by an axial passage in said spool to which pressure fluid is constantly supplied, said passage having an outlet port in said spool constantly communicating with said feedback passage, and a valve element movable with respect to said spool and constantly positioned with respect to said body forming a valve with said outlet port which valve is operated by movement of said spool in said bore.

5. A valve as set forth in claim 4 wherein said valve element is a piston slidable in said axial passage, and wherein said piston is positioned in said axial passage by means mounted by said body.

6. A valve as set forth in claim 5 wherein said piston positioning means mounted by said body is axially adjustable within said bore.

7. A valve as set forth in claim 5 wherein said control surfaces are formed at opposite endwise surfaces of said spool and each said piston projects through the respective endwise surface.

8. The improvement of claim 7 also including control means for selectively regulating the relative momenta of said regulator streams.

References Cited

UNITED STATES PATENTS

| | | | |
|---|---|---|---|
| 2,989,999 | 6/1961 | Holbrook et al. | 137—596 XR |
| 3,024,805 | 3/1962 | Horton | 137—81.5 |
| 3,122,165 | 2/1964 | Horton | 137—81.5 |
| 3,124,999 | 3/1964 | Woodward | 137—81.5 XR |
| 3,208,448 | 9/1965 | Woodward | 137—81.5 XR |
| 3,304,953 | 2/1967 | Wickline et al. | 137—596.12 |

SAMUEL SCOTT, *Primary Examiner.*

U.S. Cl. X.R.

91—3, 365